United States Patent [19]

Georgiou et al.

[11] Patent Number: 5,072,217
[45] Date of Patent: Dec. 10, 1991

[54] ONE-SIDED CROSSPOINT SWITCH WITH DISTRIBUTED CONTROL

[75] Inventors: Christos J. Georgiou, White Plains; Anujan M. Varma, Croton-on-Hudson, both of N.Y.

[73] Assignee: International Business Machines Corporation, Armonk, N.Y.

[21] Appl. No.: 429,674

[22] Filed: Oct. 31, 1989

[51] Int. Cl.[5] .............................................. H04Q 3/00
[52] U.S. Cl. .............................. 340/825.79; 370/58.1; 379/291; 379/306
[58] Field of Search ............... 340/825.29, 825.8, 826, 340/827; 379/268, 269, 271, 272, 279, 280, 291, 306; 370/16, 58.1, 59, 63; 364/200 MS

[56] References Cited

U.S. PATENT DOCUMENTS

| | | | |
|---|---|---|---|
| 3,226,688 | 12/1965 | Amdahl et al. | 364/200 |
| 4,088,845 | 5/1978 | Lalanne et al. | 379/291 |
| 4,379,950 | 4/1983 | Ahmed | 379/269 |
| 4,630,045 | 12/1986 | Georgiou | 340/825.79 |
| 4,635,250 | 1/1987 | Georgiou | 379/306 |
| 4,695,999 | 9/1987 | Lebizay | 370/16 |
| 4,706,150 | 11/1987 | Lebizay et al. | 379/272 |
| 4,763,122 | 8/1988 | Franaszek | 340/825.79 |
| 4,804,956 | 2/1989 | Boxall | 340/825.79 |
| 4,914,527 | 4/1990 | Bitzinger et al. | 379/269 |

Primary Examiner—Donald J. Yusko
Assistant Examiner—Dervis Magistre
Attorney, Agent, or Firm—Ronald L. Drumheller

[57] ABSTRACT

In a one-sided crosspoint switch, multiple controllers are used instead of a single controller for control of the switching matrix. The controllers operate in parallel, thereby handling requests for connections and disconnections from ports at a higher speed than with a single controller. In the event of a controller failure, the remaining controllers also take over the control function of the failed controller, thereby providing improved reliability.

10 Claims, 8 Drawing Sheets

ONE-SIDED CROSSPOINT SWITCH WITH DISTRIBUTED CONTROL

BACKGROUND OF THE INVENTION

1. Field of the Invention

This invention relates generally to electronic switches and more specifically to one-sided crosspoint switches for computer networks.

2. Description of the Prior Art

Figure 1:
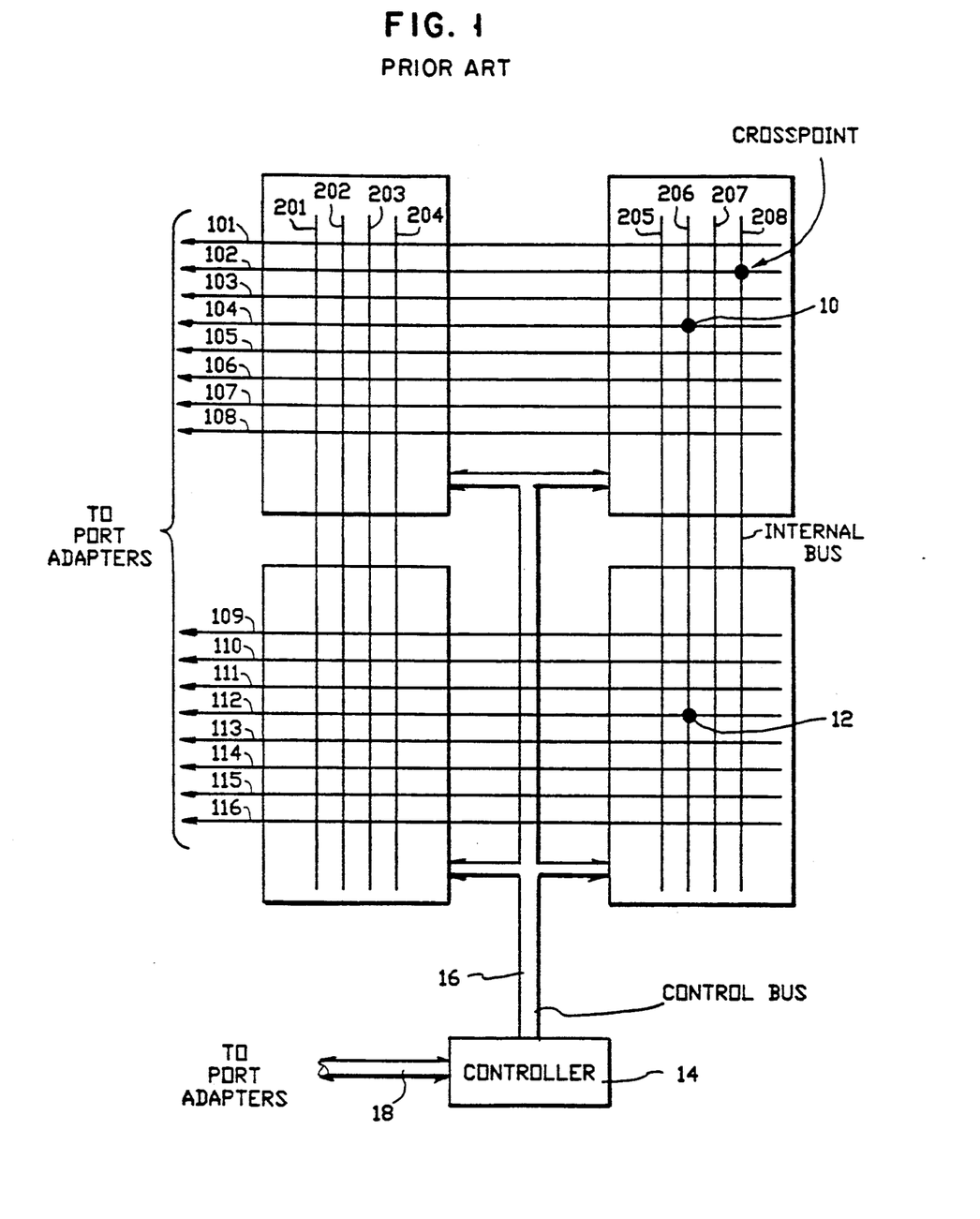
FIG. 1 is the block diagram of a prior art one-sided crosspoint switch with a single controller.

Crosspoint switches are used in the telephone and computer industry for switching data among communication lines. One type of crosspoint switch is the one-sided crosspoint switch described by Christos Georgiou in U.S. Pat. No. 4,635,250. FIG. 1 illustrates a prior art one-sided crosspoint switch. A set of data lines 101-116 is intersected by a set of internal buses 201-208, which together form a switching matrix. A crosspoint switching element (or "crosspoint") is located at each point of intersection. There are 128 crosspoint switching elements in the matrix illustrated in FIG. 1. Each data line also is connected to a switch port (or "port") via a port adapter. A connection between two data lines (and therefore between two ports) is set up by selecting one of the internal buses and then turning on the crosspoint switching elements at the points of intersection of the selected bus with each of the data lines. For example, a connection between data lines 104 and 112 (and therefore between the port connected to data line 104 and the port connected to data line 112) can be achieved by turning on switching elements 10 and 12, thereby making use of the bus 206. The same connection can be set up through any of the other internal buses, provided that it is not already in use for interconnecting a different pair of ports. For allowing simultaneous pairwise connections between all of the ports, the number of buses should be at least half the total number of ports. Such a switching system is called a non-blocking switch because it allows no connection to be blocked as a result of other connections. The 16-port switch in FIG. 1 is thus non-blocking because of the presence of eight internal buses.

A one-sided crosspoint matrix generally is constructed from one or more switching chips. If the number of ports in the system is small, the entire matrix can be implemented by means of a single chip. However, if the number of ports is large, it is necessary to partition the matrix into rectangular blocks so that each block can be implemented by a switching chip of moderate size. Each rectangular block or partition actually is a smaller one-sided crosspoint switch by itself. In such a case, the one-sided crosspoint switch can be thought of as consisting of a plurality of component one-sided crosspoint switches, typically arranged in rows and columns. For illustration, the switching matrix in FIG. 1 has been shown as consisting of four switching chips, each chip having eight horizontal data lines and four vertical internal buses.

A major advantage of one-sided crosspoint switches is the flexibility in allowing any of the internal buses to make a connection as long as the selected bus is not in use for another connection. This allows the system to operate in the presence of faulty buses. A faulty bus reduces the capacity by reducing the number of connections that can be provided simultaneously, but no ports are taken out of service as a result of the elimination of a faulty bus.

The switching gates of the crosspoint matrix are controlled by a controller 14 through a control bus 16 as shown in FIG. 1. Controller 14 receives requests for connection and disconnection from the port adapters over a port adapter bus 18 and activates or deactivates proper crosspoints in the matrix. When the combined rate at which such connections and disconnections are requested is high, a fast controller is required to handle these requests. This is frequently the case when the switch is used to interconnect computers in a multiprocessor system where the lifetime of a connection is very short.

A controller for control of one-sided crosspoint networks is described in U.S. Pat. No. 4,630,045 issued to Christos Georgiou. This controller achieves its speed by means of pipelining, that is by allowing one processing-step of a request to be executed simultaneously with another step of a second request.

When the number of ports in the switching matrix is large, however, the single controller approach described in U.S. Pat. No. 4,630,045 suffers from two limitations. If requests for connection or disconnection arrive simultaneously or close together at several ports, some of them will experience long service-times because a controller is capable of servicing requests at a rate which at best is only one per cycle, even with pipelining. Furthermore, a fault in the controller itself will disrupt its operation, thereby causing the entire system to be inoperational. In other words, the controller is a single point at which total failure can occur. The controller can be made fault-tolerant by replication, but this does not provide any improvement in performance during normal operation.

The present invention overcomes these two problems in part by distributing the control of the switching matrix among multiple controllers instead of using a single controller.

Distributed control of a two-sided crosspoint switch is described in U.S. Pat. No. 3,226,688 issued to Amdahl et al. In a two-sided crosspoint network, only one switching path exists between a pair of ports to be connected and not all pairs of ports can be connected together. Amdahl describes a modular computer system with a set of controlling modules and a set of controlled modules connected to each other through a two-sided crosspoint switch. A set of sense units controls the crosspoints, thereby allowing more than one request to be processed in the same cycle. However, every request is pre-assigned to a distinct controller, so failure of a controller affects those requests. Furthermore, the described technique cannot be applied to one-sided crosspoint networks where a multiplicity of paths exists for making a connection and any pair of ports can be connected together.

SUMMARY OF THE INVENTION

An object of the present invention is to improve the speed of large one-sided crosspoint switches.

Another object is to increase the number of connections which can be established or broken by a one-sided crosspoint switch beyond one per machine cycle.

Still another object is to provide a single-sided cross point switch which is more reliable.

It is also an object to provide a single-sided crosspoint switch with a redundant controller function.

The present invention achieves these and further objects by distributing the control of a single-sided crosspoint switching matrix among multiple controllers instead of using a single controller. The controllers are identical and operate in parallel, each setting up connections in a certain designated region of the switching matrix. Requests for connection or disconnection from the ports are distributed among the controllers using a distribution scheme such that each request is serviced by one and only one of the controllers. In the event of a controller failure, the distribution of requests is altered such that each request is routed to a fault-free controller. Thus the switch can operate so long as one of the controllers is fully functional.

This affords an improvement in reliability by allowing migration of the control function of a faulty controller to the remaining fault-free controllers. This also affords an improvement in performance by allowing multiple requests to be serviced in parallel. The number of controllers is flexible and can be chosen to optimize various parameters such as cost, performance, and reliability.

DETAILED DESCRIPTION OF THE PREFERRED EMBODIMENT

Figure 2:
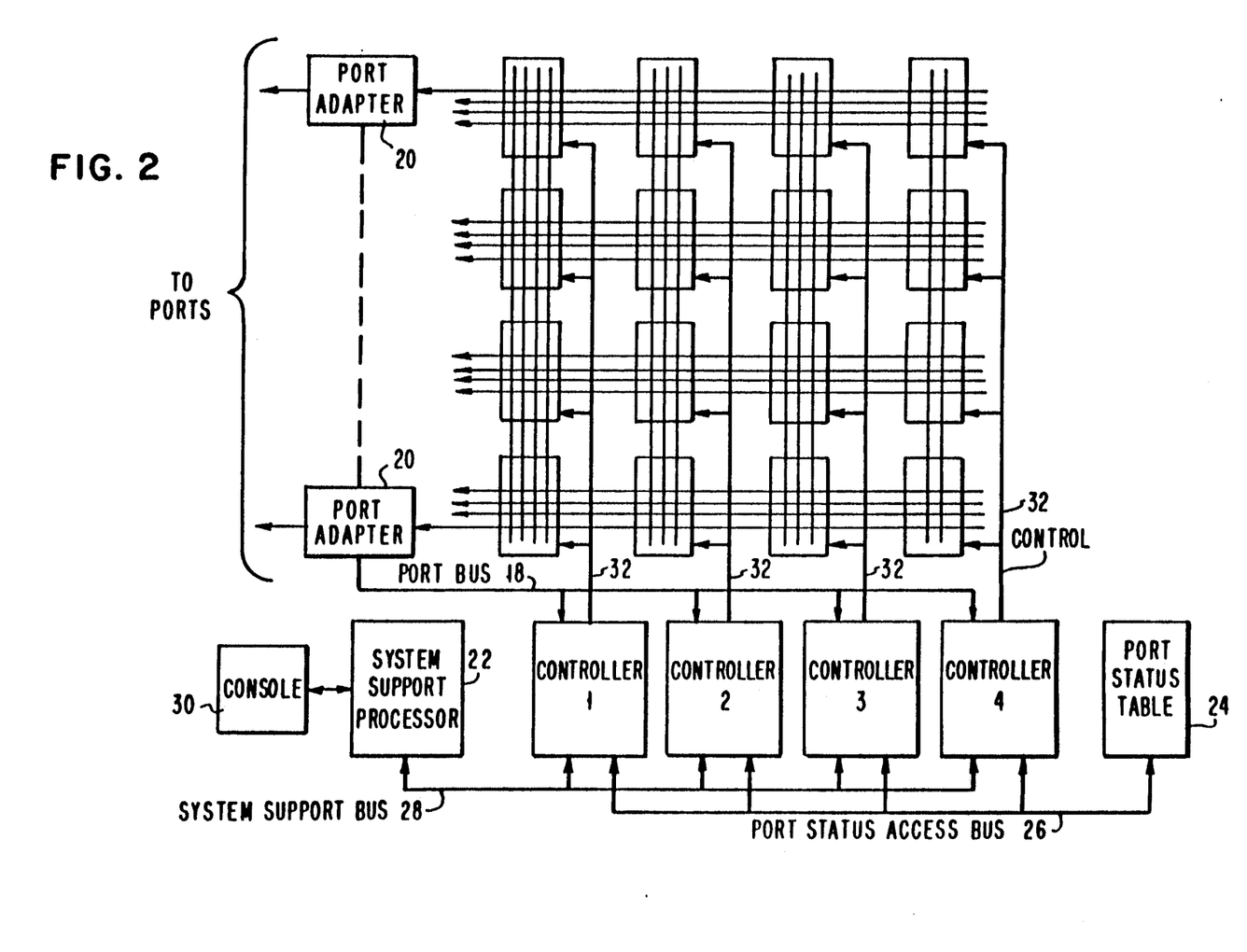
FIG. 2 is a block diagram of an embodiment of the invention illustrating a one-sided crosspoint switch with multiple controllers.

A block diagram of a preferred embodiment of the invention is shown in FIG. 2. A one-side crosspoint switch having 16 ports is implemented with 16 individual chips. The chips are arranged in a rectangular matrix with 4 horizontal rows and 4 vertical columns. Each switching chip embodies a switching matrix consisting of 4 horizontal data lines and 4 vertical internal buses. The number of vertical buses in the switching chips can be identical or they can vary in number for each chip-column. The number of internal buses for each chip-column depends on a number of design factors such as the specific scheme used for routing requests from ports among the controllers, and the degree of allowable blocking. Criteria for determination of the number of internal buses are described later.

The total number of internal vertical buses in the system is the sum of all of the individual sets of internal buses. The example shown in FIG. 2 has four buses in the first chip-column, three in each of the two middle chip-columns, and two in the last chip-column, resulting in a total of 12 internal buses. Note that the total number of vertical buses needed to achieve non-blocking operation would only be 8 (for 16 ports) if a single controller were used to set up the switching matrix. The extra 4 buses shown in FIG. 2 represent an overhead caused by the distribution of control. This overhead depends on many factors, such as the number of controllers, the specific scheme used for routing requests from ports among the controllers, and the degree of allowable blocking. The exact nature of this overhead is described in more detail later in connection with the description of methods used for distribution of requests among the controllers.

In the embodiment of FIG. 2, each column of chips is controlled by an individual controller. Thus, there are 4 controllers, the same as the number of columns of chips. It should be noted that the choice of one controller per chip-column is simply for convenience. In general, the number of controllers can be chosen to be any number so long as there is at least one internal bus for each controller. In general, the number of controllers, the number of internal buses and the distribution of the internal buses among the controllers is chosen to meet desired design objectives on cost, performance, and reliability. In the following description it is assumed, however, that the number of controllers is equal to the number of chip-columns.

Requests for connection or disconnection originate at the port adapters 20 and are conveyed to the controllers via the port bus 18. A request typically consists of the addresses of the source and destination ports involved, and the action to be performed, that is, connection or disconnection. Each of the controllers is programmed by the system support processor 22 to respond to a certain set of source and destination addresses ("port pairs") in the connection/disconnection request. A request from a port reaches all the controllers via the port bus 18, but is recognized by only the particular controller which has been programmed to process a request for connection or disconnection of that particular port pair. The status of each of the ports, that is, whether it is free or connected, is kept in a port status table 24, shared by all the controllers. The controllers access the port status table 24 via the port status access bus 26. The controllers are connected to the system support processor 22 by means of a system support bus 28. The system support processor 22 is responsible for programming the controllers during system initialization so that each controller responds to the requests from a unique set of port pairs. It is also responsible for detection of controller failures and the reprogramming the remaining fault-free controllers so as to distribute the function of the faulty controller among the remaining ones. An operator console 30 attached to the system support processor 22 allows configuration and monitoring of the system.

Figure 3:
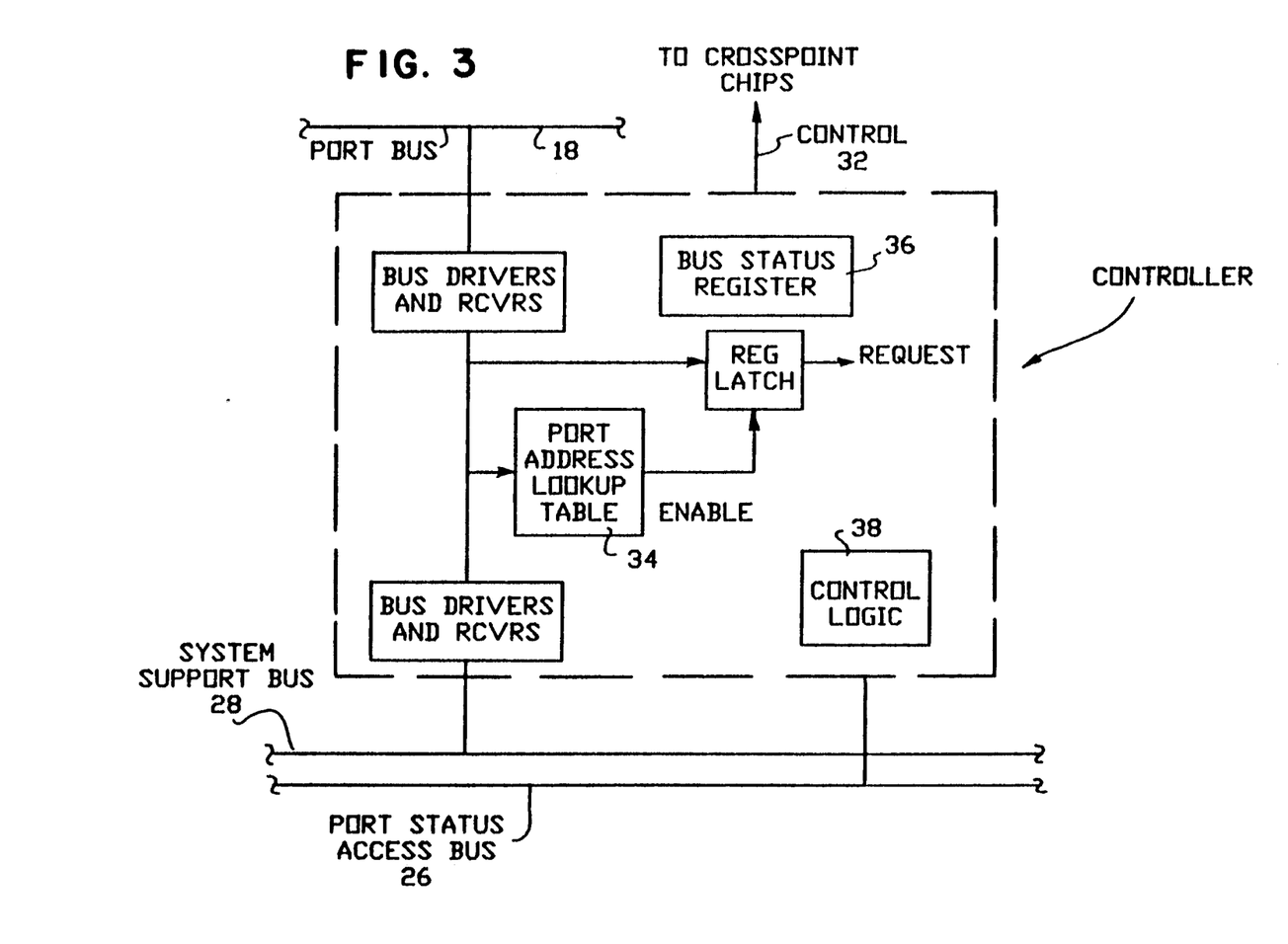
FIG. 3 is a more detailed block diagram of one of the controllers in FIG. 2 and its associated interfaces.

FIG. 3 shows one of the controllers of FIG. 2 in more detail. The controller is capable of connecting any two ports of the system, but it can use only one of the vertical buses which it controls. The controller sets up a connection between two ports by choosing a free bus (that is, a bus that is not in use for implementing any other connection at that time) and turning on the two crosspoints at the intersection of the designated bus and the two data lines connected to the ports. A disconnection is performed by turning them off. The controller addresses the individual crosspoints by means of row and column address lines. The row address selects one of the data lines and the column address selects one of the individual buses. These two sets of address lines specify a crosspoint, which can then be turned on or off by means of a set of control lines 32, which are schematically shown only as a single line.

Each controller is programmed to recognize requests for connection or disconnection between only certain port pairs. This is achieved by means of a port address lookup table 34 in the controller. The port address lookup table is a random-access-memory (RAM) addressed by the source and destination addresses in a request placed on the port bus 18. If the total number of ports is 256, for example, a port address would be 8 bits long. The port address lookup table in such case might be implemented with a random-access-memory having a capacity of 65,536 bits, organized as 65536 words times 1 bit. In the 16-port example shown in FIG. 2, the memory size is 256 times 1. A '1' might be stored at a port pair location in the port address lookup table, for example, if the corresponding pair of source and destination addresses is to be recognized by the controller and a '0' stored otherwise. The port address lookup table 34 is loaded by the system support processor 22 via the service bus 28. During system initialization, the system support processor determines which port pairs will be serviced by a particular controller and loads the port address lookup table accordingly. Similarly, if the support processor determines that a certain controller is faulty, it modifies the port address lookup tables of the controllers so that the port pairs previously assigned to the faulty controller are redistributed among the fault-free controllers.

To process a connection request, the processing controller must first determine the status of the destination port. The destination port may already be connected, either as a source port or as a destination port. The port status table 24 is used to record the status of each port, that is free or connected. The port status table is set up as a multiword random-access memory in which addresses correspond to the ports. Each location in the memory stores the status of the corresponding port. The status information consists of, at a minimum, one bit to indicate whether the corresponding port is free or connected.

The port status table 24 is shared by all the controllers. The controllers access the port status table via the port status access bus 26. The bus allows exclusive access to the table memory, one controller at a time. To make a connection between a source port A and a destination port B, it is necessary for the processing controller to check the status of both A and B in the port status table. If both are free, the controller then updates their status in the port status table as "connected". These two read and update operations should be implemented as a single indivisible operation, that is a second controller should not be allowed access to the port status table between these operations. This is achieved by allowing a controller to hold the bus 26 until the read and update operations are completed.

There are many ways in which the port status access bus 26 can be shared among the various controllers. A simple method is time-division-multiplexing, where the controllers access the bus in sequence, each occupying the bus for a fixed time-slot. Note that each time-slot consists of multiple bus-cycles to implement the read/update operations. Alternately, a controller can request the bus asynchronously when needed, and is allowed access if the bus is not in use. Simultaneous requests from more than one controller may be resolved through an arbitration scheme such as a round-robin.

A connection request originating at a port adapter is processed as follows. Let A be the originating port and B be the requested destination port. The request is broadcast on the port bus and is received by all the controllers. The pair of port addresses A, B in the request are used by each controller to address its port-address lookup table. Only one of the port-address lookup tables has a '1' stored at this location. This controller then proceeds to process the request. The remaining controllers ignore the request.

The processing controller accesses the port status table to determine if ports A and B are free and if so, updates their status to "connected". The controller then chooses a vertical internal bus under its control for making the connection. Any unused bus under its control can be chosen for the connection as long as it is not being used at the present time for making another connection. This selection is accomplished with the aid of a bus status register 36. This register contains one bit for each bus under the control of that controller to indicate its status, that is free or allocated. A '0' may be stored for every bus that is in use, for example, and a '1' for every available bus. A priority encoder (not shown) uses the output of this register to generate the address of a free bus. Once this address is obtained, the controller turns on the two crosspoints at the intersection of the selected bus and the data lines connected to ports A and B, thereby making the connection. The above sequence of operations are timed and coordinated by control logic 38 which provide the necessary control signals to the circuit elements.

If, during the processing of a connect request, the controller finds the status of either A or B as connected in the port status table, it rejects the request from the port. The controller informs the originating port adapter via the port bus that the connection cannot be made. The port adapter then informs the requesting device connected to that port by sending a special 'reject' message. A similar reject message is sent if the controller finds all the buses in its column in use. This represents a blocking condition. Such blocking can be eliminated if a sufficient number of buses are provided for each controller to handle the maximum number of simultaneous connections routed to that controller.

Note that the bus status register which records the status of each vertical bus under the control of a particular controller is local to that controller, because each controller has exclusive use of those buses. The port status table which records the status of the ports, on the other hand, is shared by all the controllers.

A disconnect request is processed in a similar manner. The request is recognized by the same controller which processed the connection request, which then releases the bus used for the connection by turning off the corresponding crosspoints. The status of the bus is marked as free in the bus status register. The port status table is also updated to reflect the "free" status of the two ports involved.

One of the merits of the invention is its fault-tolerance, in particular that of a controller. The failure of a controller affects all the requests that the controller had been originally set up to recognize. Ability to tolerate a controller failure requires two steps: (i) detection of the failure and (ii) re-programming the fault-free controllers to migrate the function of the faulty controller to the fault-free ones. The failure of a controller can be detected in many ways. One approach is to make them self-testing, which simply means that each controller is designed to test itself concurrently during its normal operation and report any errors to the system support processor. The art of designing such self-testing circuits is described in the following articles and the references therein, which are hereby incorporated by reference.

1. J.P. Hayes and E.J. McCluskey, "Testability considerations in microprocessor-based design," IEEE Computer, Vol. 13 , No. 3, March 1980, pp. 17–26.

2. E.J. McCluskey, "Built-in self-test techniques," IEEE Design and Test, Vol. 2, No. 2, April 1985, pp. 21–28.

The system support processor alternatively could be designed to test the individual controllers periodically. When the system support processor finds a controller faulty, by one of the above means, it distributes the function of the faulty controller among the remaining ones. That is, the requests initially assigned to the faulty controller are now distributed among the fault-free ones. This may be achieved by updating the port address lookup tables in the fault-free controllers in such a way that each pair of source-destination addresses (port pairs) formerly recognized by the faulty controller will be recognized thereafter by one of them. Note that a controller failure also makes the corresponding internal buses unusable. This may introduce some blocking, since there may not be enough buses serving the remaining controllers to handle all the requests routed to them. However, all the ports remain in service. Alternatively, extra buses could be provided in the design to take up the additional load when a controller fails.

Along with the fault-tolerance afforded by the one-sided crosspoint matrix itself, the invention can be used to construct a highly reliable switching system. The port status table, which is shared by all the controllers, can be protected by means of error-correcting codes to prevent it from being a single-point-of-failure. The port bus can be duplicated for reliability; this also improves performance because requests can now be routed to controllers along two separate paths.

Distribution of Requests Among Controllers

In the above description, each of the m controllers is set up to recognize certain requests based on the addresses of the source and destination ports. If there is a total of N ports in the system, and each of these ports can make a request to connect to any one of the ports excluding itself, then a total of N(N-1) distinct requests are possible, each involving a distinct pair of source and destination port addresses. These N(N-1) different possible connection requests (port pairs) must be distributed among the controllers such that each connection request is recognized by one and only one of the controllers.

Distribution of the possible port pairs among the individual controllers requires some kind of specific algorithm or scheme to determine the assignment of the port pairs to the controllers. The assignment computed by the algorithm is then used by the system support processor to set up the port address lookup tables of the individual controllers. In the following criteria are discussed for choosing such assignments and specific methods of assignment are described.

In a connection between two ports, say A and B, one of them is the requesting port (or source port) and the other is the destination port. Such a connection can be requested either by port A or port B, depending on which is the source port. It is possible that the request for connection originated at port A and the request for disconnection at port B (or vice-versa). A request involving two ports should therefore be processed by the same controller, independent of the originating port. That is, the pair of ports A, B (where A is the source and B the destination) is treated in the same way as the pair B, A for the sake of determining the processing controller. A method of distributing the requests among the controllers is therefore achieved by assigning each pair of ports A, B to a controller without distinguishing the order of appearance of A and B in the pair.

Figure 4:
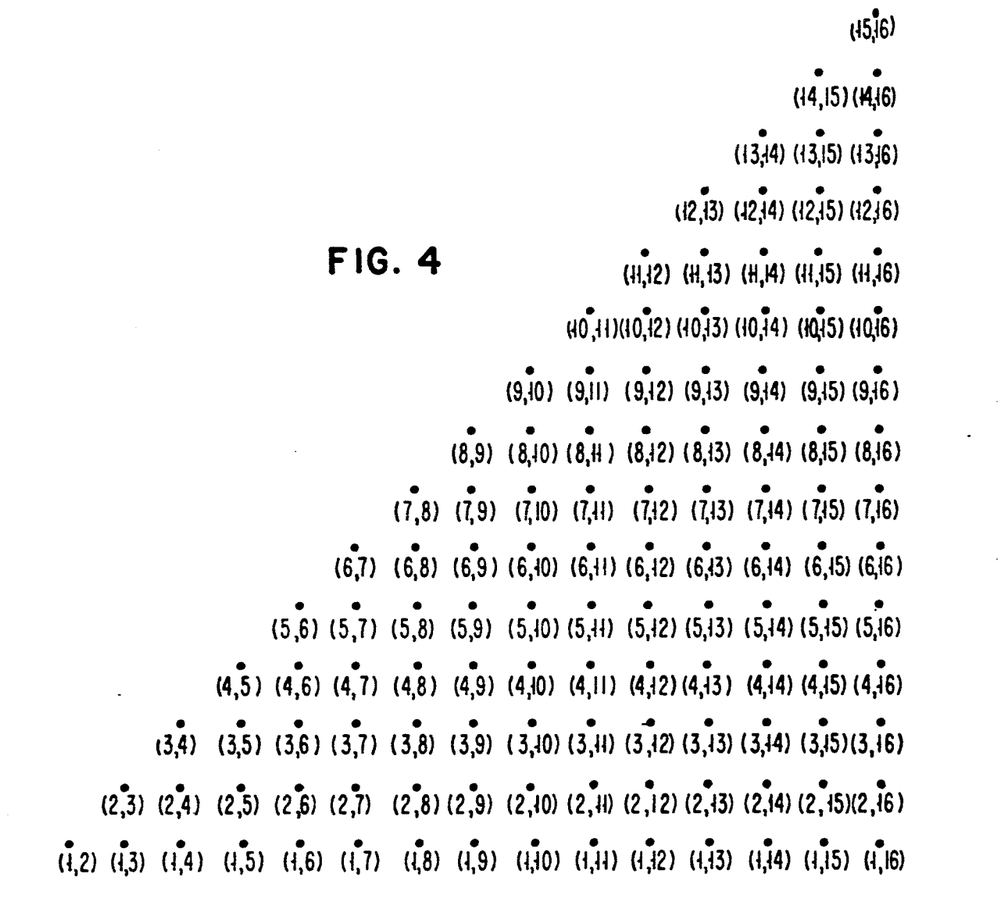
FIG. 4 shows the possible data line pairs for a 16-port switch arranged in a triangular pattern for the purpose of illustrating a method of distributing requests among the controllers.

Out of a total of N(N-1) distinct possible port pairs, however, only N(N-1)/2 pairs need be considered when no distinction is made of the order of appearance of the ports. These N(N-1)/2 port-pairs can be represented graphically on a rectangular grid as shown in FIG. 4 for N=16. Each point in FIG. 4 represents a pair of ports and there is a total of N(N-1)/2 points (120 in FIG. 4). For example, a request involving ports 1 and 4 is represented by a point on the grid at the intersection of the first horizontal line and the fourth vertical line, and is shown as (1,4). It can be seen that the points form a triangular region. There are exactly (N-1) points along the lower edge of the triangle and (N-1) points along the right edge. The problem of distributing the requests among the controllers can now be visualized as assigning each point in FIG. 4 to one of the controllers.

Any arbitrary assignment of points to the controllers would function correctly as long as every point is assigned to one of the controllers and no point is assigned to more than one controller. However, an arbitrary assignment can cause the following problems:

1. The assignment can result in one of the controllers being overloaded as compared to others. This would limit the degree of parallelism obtained and consequently make the system slower. This can occur if a large number of points is assigned to one of the controllers as compared to others. Ideally the requests from ports should be distributed uniformly among the controllers. If each port is assumed to access every other port with equal likelihood, then each of the points in FIG. 4 occurs with identical probability. Thus, in the average case, load balancing is achieved if these points are partitioned into sets of approximately equal size and each set is assigned to a distinct controller.

2. Setting up connection between two idle ports requires the availability of a free vertical bus assigned to the relevant controller. A sufficient number of buses ideally needs to be provided to each controller such that a free bus is always available for every possible sequence of requests in which both the source and destination terminals are not already connected. In a one-sided matrix controlled by a single controller, this property is achieved if the number of buses is N/2. With distributed control, each controller needs a certain number of buses to make the switch non-blocking and this number depends on the way the points are assigned to the controllers. To illustrate this, let us assume that the eight points (1,2), (1,3), (1,4), (1,5), (1,6), (1,7), (1,8), (1,9) in FIG. are assigned to one of the controllers. Since the port 1 occurs in each of these pairs, at most one of these connections can exist simultaneously. Therefore, one bus is sufficient to cover all these eight points. Now consider a second assignment where a different set of eight points (1,2), (3,4), (5,6), (7,8), (9,10), (11,12), (13,14), (15,16) are assigned to a controller. Each of these connections can exist simultaneously; therefore, eight buses are needed by this controller to make the switch non-blocking. A good assignment should minimize the total number of buses required for the controllers.

A specific partitioning scheme will now be described with the following desirable properties:
1. The number of points in each partition is approximately equal.
2. The total number of buses needed over all the partitions for non-blocking operation is a minimum.

Figure 5:
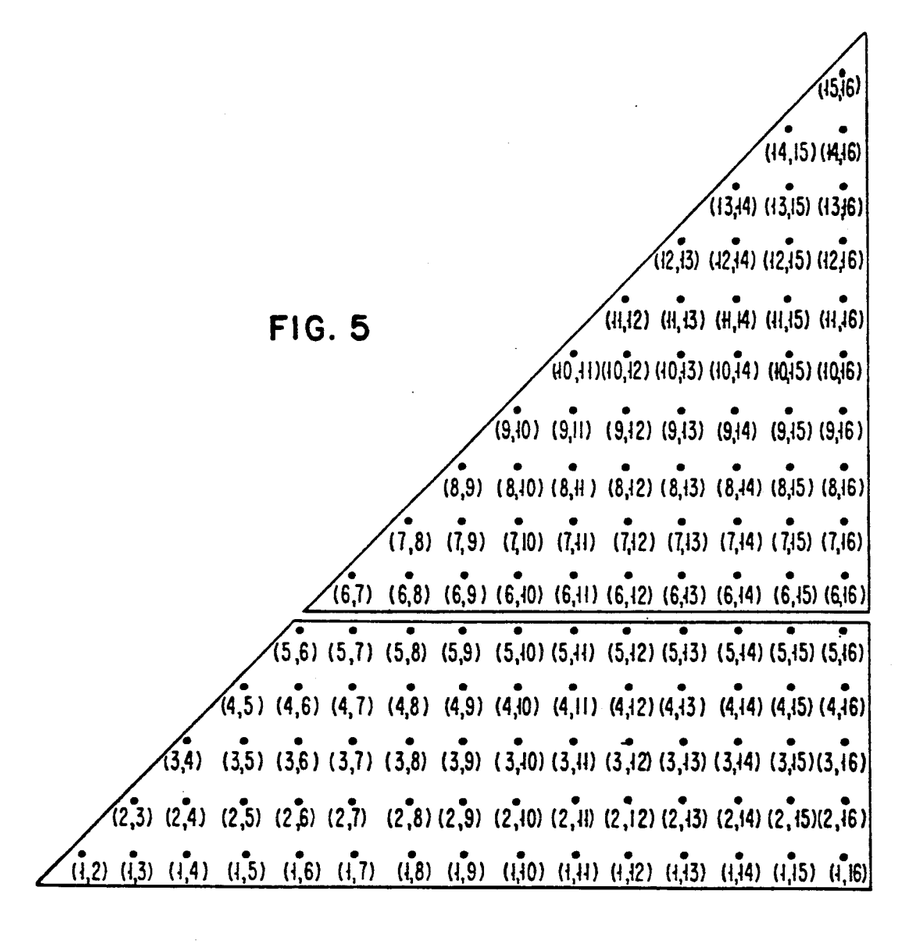
FIG. 5 illustrates a method for the assignment of the data line pairs among the controllers for a 16-port switch with two controllers.

The partitioning scheme will be described first with two controllers. The basic idea is to divide the triangular shape in FIG. 4 into two regions of approximately equal area by a horizontal line. FIG. 5 shows this partitioning for a 16-port switch. The horizontal line divides the 120 points into two parts. The upper partition has a triangular shape and has 55 points and the lower one has 65 points. Note that it is impossible in this case to partition the triangular region into two parts by a horizontal line such that the number of points in each half is exactly identical. The difference in their size would depend on the number of ports N. The points in each partition are then assigned to the corresponding controller. The maximum number of simultaneous connections possible for each of the partitions in FIG. 5 is 5. Therefore a total of 10 buses are needed for both the partitions to be non-blocking.

To generalize the above partitioning with two controllers for all values of N, the basic idea is to partition the triangle of N(N-1)/2 points into two parts such that the upper part, by itself, forms a triangular region. The partitioning is such that the difference in the number of points in the two parts is a minimum. The maximum number of simultaneous connections possible in the upper partition is half its height. The maximum number of simultaneous connections possible in the lower partition is its height. Therefore the total number of buses needed with this partitioning method is 0.646N. Note that this represents an overhead of 30 percent over the single-controller case. In the example of FIG. 5, 0.646N=10.336; choosing the largest integer value of 10.336 gives 10, the same as observed in the previous paragraph.

It can be shown theoretically that the number of buses needed to achieve non-blocking operation with two partitions of equal size cannot be less than 0.646N. Therefore, the assignment above is the best one can achieve in terms of the number of buses needed.

Once the basic idea of this partitioning method is clear, it is easy to generalize it for any number of controllers. The triangular region is now divided into horizontal "bands" such that the area of each band is approximately equal. The maximum number of simultaneous connections in each partition can now be computed easily from the height of the corresponding band; for the top partition, the maximum number of simultaneous connections is equal to half its height, and for the remaining partitions it is equal to the height of the band. For the purpose of illustration, the number of buses computed by this method as a fraction of N is shown in the following Table for certain numbers of controllers.

TABLE

| Number of controllers | Total buses |
|---|---|
| 2 | 0.646 N |
| 3 | 0.711 N |
| 4 | 0.750 N |
| 8 | 0.823 N |
| 16 | 0.875 N |

TABLE-continued

| Number of controllers | Total buses |
|---|---|
| 32 | 0.912 N |

Figure 6:
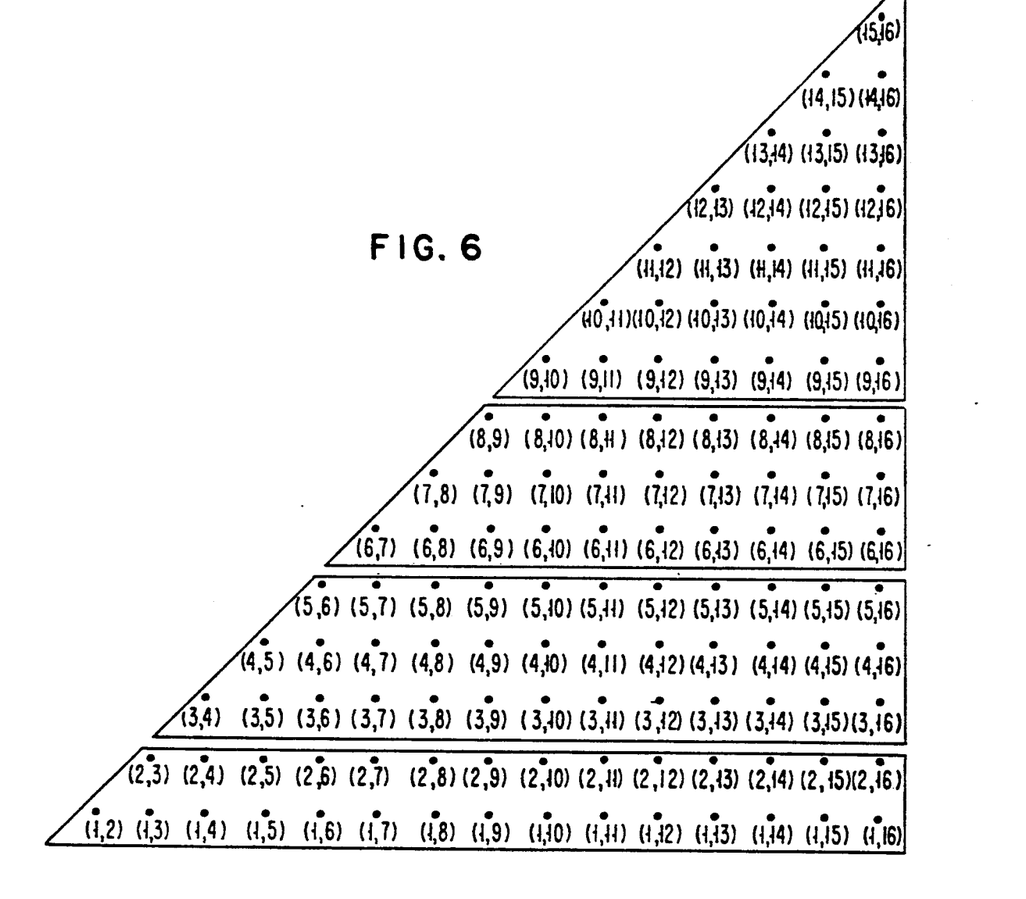
FIG. 6 illustrates the FIG. 5 method for a 16-port switch with four controllers.

FIG. 6 illustrates the same partitioning method for a 16-port switch with 4 controllers. The number of points in the partitions are 28, 27, 36, and 29, respectively from top to bottom. The number of buses needed for non-blocking operation of the individual partitions are 4, 3, 3, and 2, respectively, resulting in a total of 12 buses.

Figure 7:
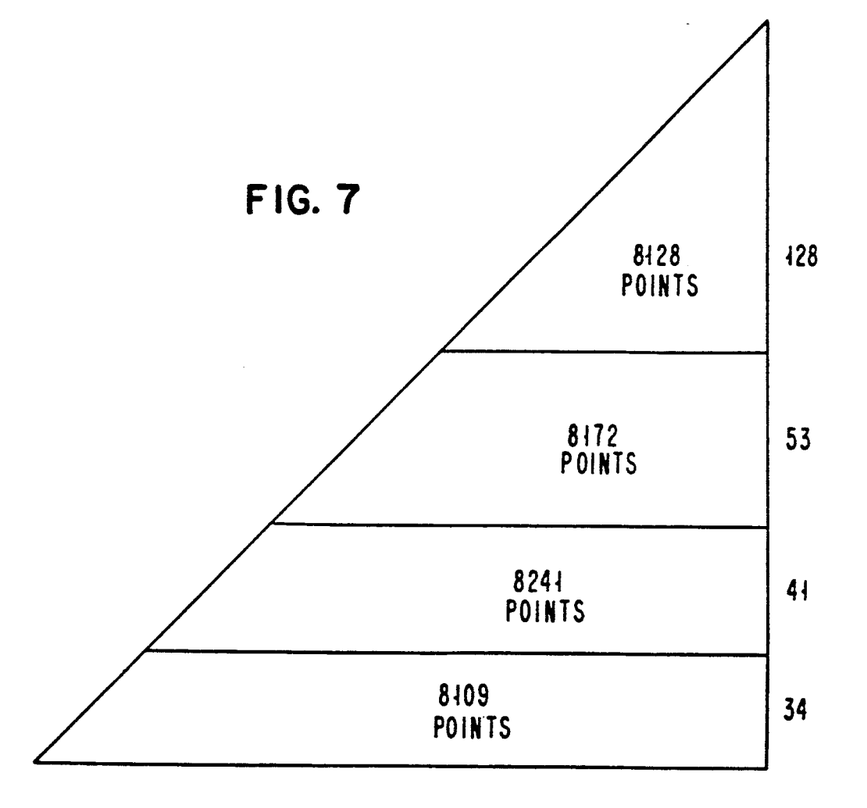
FIG. 7 illustrates the FIG. 5 method for a 256-port switch with four controllers.

FIG. 7 illustrates the same partitioning method with four controllers in a switch with 256 ports. There is a total of 256 times 255/2=32,640 points in the triangle. The four partitions have 8128, 8172, 8241, and 8109 points respectively from top to bottom. The height of the partitions are 128, 53, 41, and 34, respectively. The total number of buses needed is therefore 64+53+41+34=192 for each partition to be non-blocking.

A Second Method of Assignment

Figure 8:
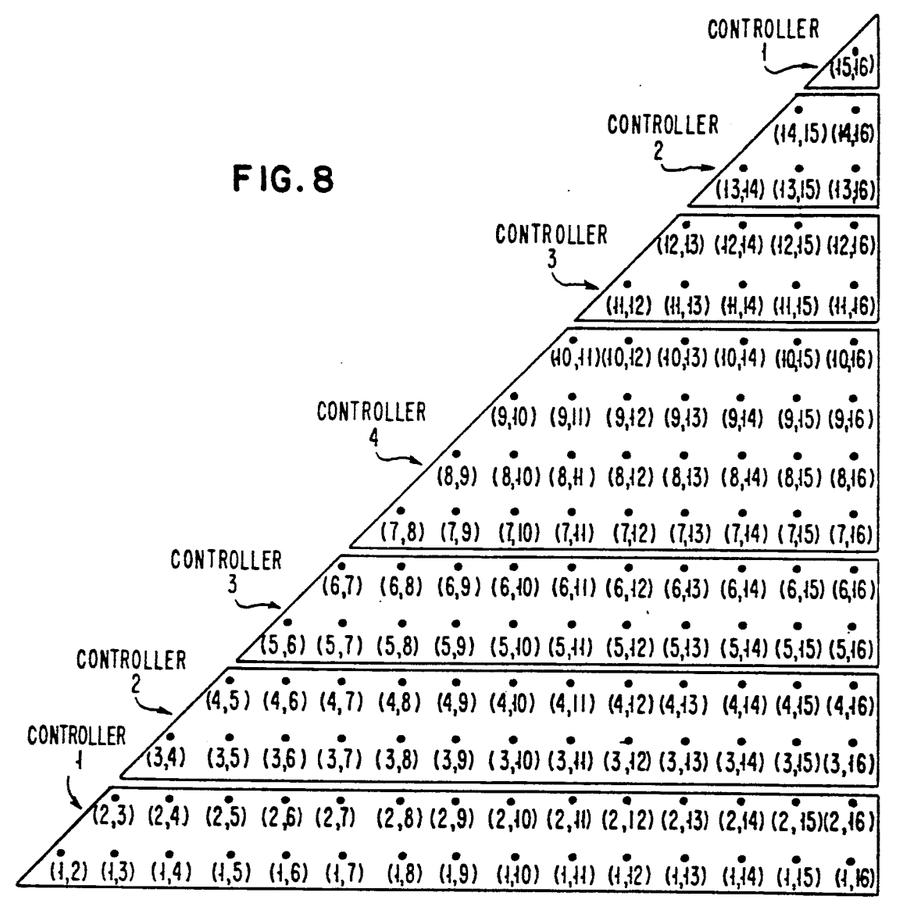
FIG. 8 illustrates another method for the assignment of data line pairs for a 16-port switch with four controllers.

In the above method of assignment, the number of points in each partition is approximately equal. A different method of assignment will now be described where the number of points in each partition are exactly equal. This is possible if the number of ports N is a multiple of the number of controllers M. FIG. 8 illustrates this method for 16 ports 4 controllers.

This assignment is obtained from the triangular pattern of points in a simple manner: Let k be the number N/2M. Starting from the first row of the triangle, the points in the first k rows are assigned to controller 1, the next k rows to controller 2, and so on until controller M. This covers the first N/2 rows. The remaining rows are assigned to controllers in the same way, but in reverse order, that is the first k rows are assigned to controller M, the next k rows to controller M-1, and so on until controller 2. Exactly k-1 rows remain unassigned at this point, which are then assigned to controller 1. Thus, each controller except controller 1 is assigned 2k rows and controller 1 is assigned 2k-1 rows.

The maximum number of vertical buses needed for any controller is N/M (4 in the example of FIG. 8) for each of the partitions 2 through M, and N/M-1 for the first partition. Therefore, the total number of buses needed for non-blocking operation can be as large as N-1 with this assignment.

With this second assignment, each controller is assigned exactly the same number of points. Therefore, the load is evenly balanced among the controllers on the average. However, when N is large in comparison to M, as is the case in practice, slight non-uniformities among the size of the partitions may not affect the performance significantly. For example, the partitions in FIG. 7 have a maximum difference of 1.6 percent in the number of points they contain. Therefore, the first scheme is preferable for most cases because of the lower overhead in the number of buses.

When one of the controllers fails, its function needs to be distributed among the fault-free controllers. This process of reconfiguration can be achieved in two ways: (i) transparent to the connections serviced by the fault-free controllers, and (ii) by a re-initialization of the controllers, with an accompanying temporary disruption of service for all the connections. The first one is the preferred method. Both methods will now be described.

It is to be noted that, either of the above methods results in an increase in the number of port pairs assigned to each of the fault-free controllers. This, in general, also increases the maximum number of simultaneous connections possible in each partition. As a result, some blocking may be introduced if the number of buses in a partition is less than the maximum number of connections possible. The rearrangement of port pairs upon a controller failure should be in such a way as to minimize this blocking.

1. Reconfiguration without disruption of fault-free controllers: This is the preferred method of operation. In this case, the function of the faulty controller is distributed among the fault-free ones without causing a disruption of service. The only connections affected are the connections in the failed partition. The port pairs assigned to fault-free controllers are not modified. The points assigned to the faulty controller are simply distributed among the fault-free ones.

A method is required to distribute the port-pairs in the faulty partition among the fault-free ones. The new assignment would depend on the initial assignment used. Again, any reassignment would work correctly if every port-pair in the failed partition is assigned to one of the fault-free controllers and no port-pair is assigned to more than one controller. However, the preferred embodiment should satisfy the following, the same properties desired of the initial assignment.

(i) The number of points in each partition is approximately equal.
(ii) The total number of buses needed over all the partitions for non-blocking operation is a minimum. This minimizes the blocking introduced as a result of the controller-failure.

A method will now be described of distributing the port pairs in a failed partition among the other partitions in accordance with the preferred partitioning scheme of FIG. 6. The same method used for finding the initial assignment is used find an assignment for partitioning the set of points belonging to a faulty controller. The basic idea is to divide the region into M-1 horizontal bands such that the number of points in each band is approximately equal.

Assume, for example, that controller 1, which corresponds to the uppermost partition of FIG. 6, fails. The 28 points in the uppermost partition of FIG. 6 now need to be divided into three sets and assigned to the remaining three controllers. Such an assignment can be obtained as follows:

Set 1: (15,16), (14,15), (14,16), (13,14), (13,15), (13,16), (12,13), (12,14), (12,15), (12,16).
Set 2: (11,12), (11,13), (11,14), (11,15), (11,16), (10,11), (10,12), (10,13), (10,14), (10,15), (10,16).
Set 3: (9,10), (9,11), (9,12), (9,13), (9,14), (9,15), (9,16).

The first set contains 10 points, the second 11, and the third 7. Set 1 can now be assigned to controller 2, set 2 to controller 3, and set 3 to controller 4.

2: Reconfiguration with temporary disruption of service: In this case, a complete reassignment of the port pairs to controllers is performed upon a controller failure. This method finds an assignment of the N(N-1)/2 points among the remaining controllers using the algorithms or methods explained previously. This will cause a disruption of service to all the connections as opposed to the previous case where only the connections serviced by the failed controller are disrupted. However, in this case, less blocking may be introduced because the new assignment can be optimized among the remaining controllers.

In either of the above cases, the reconfiguration is performed by the system support processor, which keeps track of the current assignment of the port pairs among the individual controllers. A subsequent failure can be handled in the same manner. In the worst case, a single fault-free controller remains, with all the N(N-1)/2 pairs assigned to A number of modifications and variations will be apparent to those of ordinary skill in this art.

For example, in the above described embodiment, each controller was assigned approximately the same number of distinct port pairs. This results in equal loading of the controllers on the average if the request pattern is uniform, that is each port pair appears with almost equal probability. However, if the request pattern is skewed, that is certain port pairs occur more frequently compared to others, then load balance can be achieved by resorting to a non-uniform distribution of port pairs among the controllers. Each controller could be assigned an unequal number of port pairs such that the cumulative probability of appearance of all the port pairs assigned to each controller is approximately identical.

Distributed control causes an overhead in terms of the number of buses needed if non-blocking operation of the system is desired. However, it is often possible to operate a partition with no discernible blocking in practice with a smaller number of buses than the maximum number of simultaneous connections possible in that partition. This is because such a large number of simultaneous connections occur very rarely due to the random nature of connection requests. For example, if blocking occurs only once every million requests, no perceivable degradation in the performance of the system may result. So some blocking might be tolerated and could be accepted in the design.

We claim:

1. A one-sided crosspoint switch for making simultaneous electrical interconnections among a plurality of ports in response to interconnection requests, comprising:
 a plurality of internal buses;
 a plurality of crosspoint switching elements;
 each one of said crosspoint switching elements being connected to one of said ports and to one of said internal buses for selectively electrically interconnecting said connected port to said connected internal bus;
 a plurality of controllers;
 each one of said controllers being connected to and controlling all of said crosspoint switching elements that are connected to a unique set of said internal buses;
 each distinct electrical interconnection possibility between any two of said ports being uniquely assigned to one of said controllers;
 port status table means responsive to said controllers for storing the status of each of said ports as either connected to another one of said ports or disconnected;
 means within each one of said controllers for receiving interconnection requests and for recognizing an interconnection request that corresponds to an interconnection possibility assigned to said each one controller;

means within said each one controller, responsive to recognition of an interconnection request by said recognizing means, for accessing said port status table means to determine whether the ports needed to implement said recognized interconnection request are available and for determining whether at least one of said internal buses controlled by said each one controller is available; and means within said each one controller, responsive to said recognizing means and said accessing and determining means when the needed ports are available and at least one of said controlled internal buses is available, for implementing said recognized interconnection request using one of said at least one available controlled internal buses; and means responsive to implementation of each interconnection request for updating said port status table means, whereby said controllers can simultaneously process and implement a plurality of interconnection requests.

2. A one-sided crosspoint switch as defined in claim 1 wherein said each one controller controls all of said crosspoint switching elements that are connected to said internal buses controlled by said one controller.

3. A one-sided crosspoint switch as defined in claim 1 wherein said port status table means is a common storage means separate from said controllers and accessable by said controllers via a common bus.

4. A one-sided crosspoint switch as defined in claim 1 wherein said means for receiving interconnection requests comprises a common bus interconnecting said controllers over which all interconnection requests are broadcast to all said controllers.

5. A one-sided crosspoint switch as defined in claim 1 wherein each distinct interconnection possibility is assigned uniquely to one of said controllers by maintaining a list for each of said controllers of the port pairs uniquely assigned to said each controller.

6. A one-sided crosspoint switch as defined in claim 5 wherein said list of port pairs uniquely assigned to said each controller is stored in said each controller.

7. A one-sided crosspoint switch as defined in claim 5 wherein each port pair in said list of port pairs assigned to said each controller assigns to said each controller the unique interconnection request for connection of the first port of said each port pair to the second port of said each port pair and the unique interconnection request for connection of the second port of said each port pair to the first port of said each port pair.

8. A one-sided crosspoint switch as defined in claim 1, and further comprising means for redistributing said unique interconnection request possibilities among said controllers by modifying said lists.

9. A one-sided crosspoint switch as defined in claim 1, and further comprising:
   means assigning each distinct disconnection possibility uniquely to one of said controllers;
   means for communicating to each said controller at least all disconnection requests which correspond to the unique set of disconnection request possibilities assigned to said each controller; and
   means within each said controller for recognizing a disconnection request which corresponds to a disconnection request possibility assigned to said each controller and for implementing any recognized disconnection request.

10. A one-sided crosspoint switch as defined in claim 9 wherein said interconnection request possibilities assigned to each said controller and said disconnection request possibilities assigned to each said controller comprise a single list of port pairs assigned to each controller, each port pair in one of said single lists representing both the interconnection request possibility and the disconnection request possibility from either port in said port pair to the other port in said port pair.

* * * * *